United States Patent
Healy et al.

(10) Patent No.: US 9,489,781 B2
(45) Date of Patent: Nov. 8, 2016

(54) SYSTEMS AND METHODS FOR UTILIZING TELEMATICS DATA

(71) Applicant: United Services Automobile Association, San Antonio, TX (US)

(72) Inventors: Jodi J. Healy, Johns Creek, GA (US); Paul G. Canario, San Antonio, TX (US); Steven T. Drawert, San Antonio, TX (US); Christine M. Brown, San Antonio, TX (US); Rod Gonzales, San Antonio, TX (US); Robert K. Dohner, San Antonio, TX (US); Joel Camarano, San Antonio, TX (US)

(73) Assignee: UNITED SERVICES AUTOMOBILE ASSOCIATION, San Antonio, TX (US)

( * ) Notice: Subject to any disclaimer, the term of this patent is extended or adjusted under 35 U.S.C. 154(b) by 271 days.

(21) Appl. No.: 14/168,719

(22) Filed: Jan. 30, 2014

(65) Prior Publication Data
US 2014/0214750 A1    Jul. 31, 2014

Related U.S. Application Data

(60) Provisional application No. 61/758,414, filed on Jan. 30, 2013.

(51) Int. Cl.
*G06F 17/00* (2006.01)
*G06N 5/02* (2006.01)
*G07C 5/08* (2006.01)

(52) U.S. Cl.
CPC .................................. *G07C 5/0808* (2013.01)

(58) Field of Classification Search
USPC .......................................................... 706/48
See application file for complete search history.

(56) References Cited

U.S. PATENT DOCUMENTS

| | | | | |
|---|---|---|---|---|
| 8,000,452 | B2 * | 8/2011 | Watkins | G10L 15/22 379/88.02 |
| 8,065,334 | B2 * | 11/2011 | Mukherjee | G06Q 10/10 707/792 |
| 8,112,261 | B2 * | 2/2012 | Song | G01S 19/23 342/360 |
| 9,014,888 | B2 * | 4/2015 | Sukkarie | G01C 21/26 701/22 |
| 2009/0243914 | A1 * | 10/2009 | Song | G01S 19/23 342/169 |
| 2013/0321145 | A1 * | 12/2013 | Ranieri | G06F 19/327 340/539.12 |

OTHER PUBLICATIONS

Predicting Object Trajectories from High-Speed Streaming Data Nikolaos Zorbas; Dimitrios Zissis; Konstantinos Tserpes; Dimosthenis Anagnostopoulos Trustcom/BigDataSE/ISPA, 2015 IEEE Year: 2015, vol. 2 pp. 229-234, DOI: 10.1109/Trustcom.2015. 588 IEEE Conference Publications.*

* cited by examiner

*Primary Examiner* — Michael B Holmes
(74) *Attorney, Agent, or Firm* — Baker & Hostetler LLP

(57) ABSTRACT

A computer system and method for performing predictive analytics on telematics data regarding an entity. The computer system having a memory configured to store instructions and a processor disposed in communication with the memory. The processor upon execution of the instructions is configured to receive telematics data regarding an entity and analyze the received telematics data to identify a pattern of behavior. A behavioral conclusion and/or meaning is then determined for the entity based on analysis of the received telematics data.

20 Claims, 3 Drawing Sheets

SYSTEMS AND METHODS FOR UTILIZING TELEMATICS DATA

CROSS REFERENCE TO RELATED APPLICATIONS

This application claims priority to U.S. Patent Application Ser. No. 61/758,414 filed Jan. 30, 2013 which is incorporated herein by reference in its entirety.

FIELD OF THE INVENTION

The disclosed embodiments generally relate to utilizing telematics data, and more particularly, to analyzing telematics data to determine meaning and/or behavioral conclusions from captured telematics data.

BACKGROUND OF THE INVENTION

Telematics equipment is in wide use today. Through the use of telematics equipment, a large amount of information is generated and collected about the movement of individuals and objects. Such information, however, at its most basic level only describes where a person or vehicle has been, and, in some cases, the manner (e.g. speed) in which the person or vehicle traveled to a particular destination.

It would be useful to extract greater meaning from telematics data. It would be useful because one could use such information to deliver tailored products and services to individuals and organizations. One could tailor these offerings by basing them upon real events as predicted by the historical movements and behaviors of individuals and objects. Therefore, what is needed are systems and methods for utilizing telematics data to provide products and services.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a computer system and method for performing predictive analytics on telematics data regarding an entity is described. The computer system having a memory configured to store instructions and a processor disposed in communication with the memory. The processor upon execution of the instructions is configured to receive telematics data regarding an entity and analyze the received telematics data to identify a pattern of behavior. A behavioral conclusion and/or meaning is then determined for the entity based on analysis of the received telematics data.

In further, optional aspects, received telematics data regarding an entity is selected from the group consisting of behavioral, movement, condition and health telematics data which telematics data is then analyzed to identify a pattern of behavior including determining a certain type of behavior at a certain level of frequency. A conclusion and/or an inferred meaning is then determined for the entity based on the analyzed telematics data.

BRIEF DESCRIPTION OF THE DRAWINGS

So that those having ordinary skill in the art, to which the present invention pertains, will more readily understand how to employ the novel system and methods of the present invention, certain illustrated embodiments thereof will be described in detail herein-below with reference to the drawings, wherein.

DETAILED DESCRIPTION OF CERTAIN EMBODIMENTS

Figure 1:
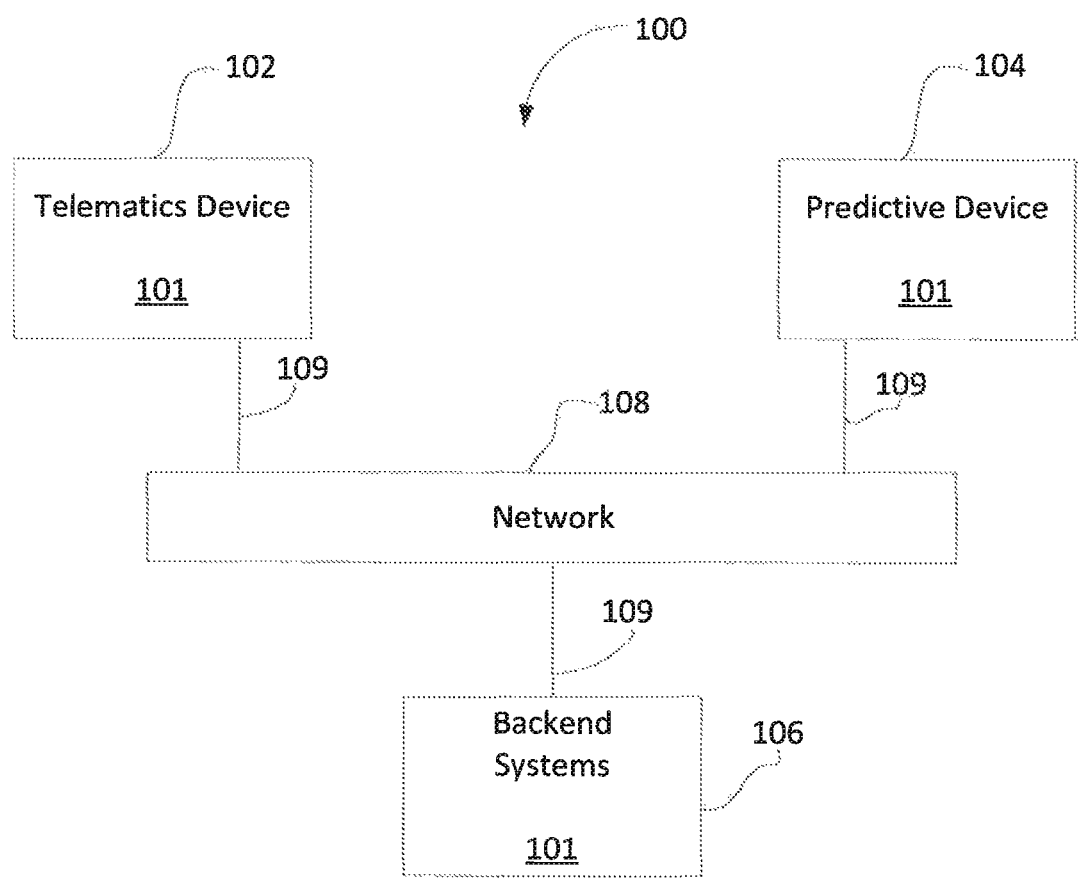
FIG. 1 depicts one embodiment of a system for utilizing telematics data to provide products and services.

The present disclosure is directed to systems and methods for utilizing telematics data to provide products and services. It is to be appreciated that the subject invention is described below more fully with reference to the accompanying drawings, in which illustrated embodiments of the present invention are shown. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. A component or a feature that is common to more than one drawing is indicated with the same reference number in each of the drawings. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited.

It must be noted that as used herein, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated that certain embodiments of this invention as discussed below are a software algorithm, program or code residing on computer useable medium having control logic for enabling execution on a machine having a computer processor.

The machine typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

Referring to FIG. 1, a system 100 is provided. System 100 in one example comprises at least one device 101. In one example, at least one device 101 comprises at least one telematics device 102, a predictive device 104, backend systems 106, and network 108. Telematics device 102 in one example is a device that collects, stores, and/or sends information about a living thing or object ("entity"). Such information includes, but is not limited to information regarding an entity's behavior, movement, condition and/or health. It must be noted that the term "telematics" is commonly associated with the use of Global Positioning Systems (GPS) technology that is commonly used in automotive navigations systems whereby telematics data is collected, stored and extracted from vehicle embedded platforms/ hardware devices (e.g., as installed by the OEM, via an OBD self-install or a mobile device). The present disclosure is not limited to such technology, but rather is meant to encompass a broad array of devices, including vehicle navigation systems, that are used to collect, store, and send information about entities. Such devices include mobile devices, GPS devices, and the like, but also include other devices that can be associated with entities, such as REID tags, accelerometer devices, or small scale radio transceivers, to track movement, behavior, condition, and/or health of an entity. In addition, it is noted that telematics device 102 may also be a device that is not specifically associated with an entity, but nevertheless is capable of collecting, storing, and/or sending information about a living thing or object. An example would be a surveillance camera or traffic camera or a plurality of such devices working in concert. Another example of telematics devices are devices that are capable of collecting, storing, and/or sending biometric information about an individual, such as a blood pressure monitor, a heart rate monitor, a scale, a breathalyzer device, a skin elasticity monitor, a wearable computing device (e.g., a smart watch device), etc. It follows that the representation of telematics device 102 as a singular device is provided for illustrative purposes only. Telematics device 102 may comprise a single device or a plurality of devices working individually or in concert to collect, store, and/or send information about the behavior or movement of a living thing or object.

It is to be further appreciated that another aspect of the illustrated embodiments includes acquiring telematics data from third party database/services, which acquired data is leveraged to add one or more contextual aspects, including (but not limited to) traffic and weather intelligence with regards to the below discussed analysis of telematics data.

Predictive device 104 in one example is a device that receives information from telematics device 102 and processes such information to provide or assist in providing products, services, and information to individuals or organizations based on the information received from telematics device 102. An illustrative discussion of predictive device 104 will be provided in connection with FIG. 2 for illustrative purposes.

Back end systems 106 in one example are systems that exchange information with telematics device 102 and/or predictive device 104. Back end systems 106 in one embodiment may comprise the systems of an insurance carrier. In one embodiment, back end systems may comprise the systems of a partner with an insurance carrier. In one embodiment, back end systems 106 may comprise the system of a stand alone provider of products, services, and/or information. This description of back end systems 106 is not meant to be limiting. Back end systems 106 may comprise any or all of the preceding embodiments and in various combinations thereof. The designation of such entity as "back end systems" is mean for illustrative purposes and for ease of description. For instance, a back end system 106 may be configured and operational to exchange data from device 102 (e.g., a vehicle telematics device) to a home such that analytics are performed using the data in the home environment.

In one embodiment, the device 101 generally includes at least one memory device, at least one processor, and at least one data interface coupled via buses. Such devices may be coupled to another device or to peripheral devices. FIG. 1 depicts devices as standalone for illustrative purposes. Multiple devices may be coupled and function together as further described herein as part of a distributed processing environment. Exemplary devices 101 include, but are not limited to computing devices, such as mobile device (e.g. cell phones, smart phones, etc.), personal computers, notebook computers, tablet computers, servers, and telematics devices, such as personal or vehicular navigations systems or biometric devices (or computing devices with such functionality).

A memory device in one example comprises a computer-readable signal-bearing medium. One example of a computer-readable signal-bearing medium comprises a recordable data storage medium, such as a magnetic, electrical, optical, biological, and/or atomic data storage medium. In another example, a computer-readable signal-bearing medium comprises a modulated carrier signal transmitted over a network coupled. In one example, a memory device includes a series of computer instructions written in or implemented with any of a number of programming languages, as will be appreciated by those skilled in the art.

A processor is an electronic device configured of logic circuitry that responds to and executes instructions. A processor may comprise more than one distinct processing devices, for example to handle different functions. A processor may output results of an execution of the methods described herein to an output device connected to interface. Alternatively, a processor could direct the output to another device 101 via network.

A data interface may include the mechanical, electrical, and signaling circuitry for communicating data over a network or directly to another device 101. An interface may be configured to transmit and/or receive data using a variety of different communication protocols and various network connections, e.g., wireless and wired/physical connections. An interface may include an input device, such as a keyboard, a touch screen or a speech recognition subsystem, which enables a user to communicate information and command selections to a processor. An interface may also include an output device such as a display screen, a speaker, a printer, etc. An interface may include an input device such as a touch screen, a mouse, track-ball, or joy stick, which allows the user to manipulate the display for communicating additional information and command selections to a processor.

Devices 101 may communicate with each other directly or over a network 108. Network 108 may include a local area network (LAN) and/or a wide area network (WAN), but may also include other networks such as a personal area network (PAN). Such networking environments are commonplace in offices, enterprise-wide computer networks, intranets, and the Internet. For instance, when used in a LAN networking environment, devices 101 are connected to the LAN through a network interface or adapter (not shown). When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules may be stored in a remote memory storage device such as storage medium. Devices 101 may communicate over network 108 through one or more communications links 109. Communication links 109 may be wired (e.g. Ethernet, USB, Firewire, etc.) or wireless (e.g. Bluetooth, 802.11, 3GPP, 3GPP2, etc.) or a combination thereof. Devices 101 may also communicate with each other through other wireless technologies as (RFID, IrDA, barcodes).

Finally, it must be noted that the designation of telematics device 102, predictive device 104, and back end systems 106 as stand alone entities is provided for illustrative purposes. The functionality of these entities may be combined or divided.

Figure 2:
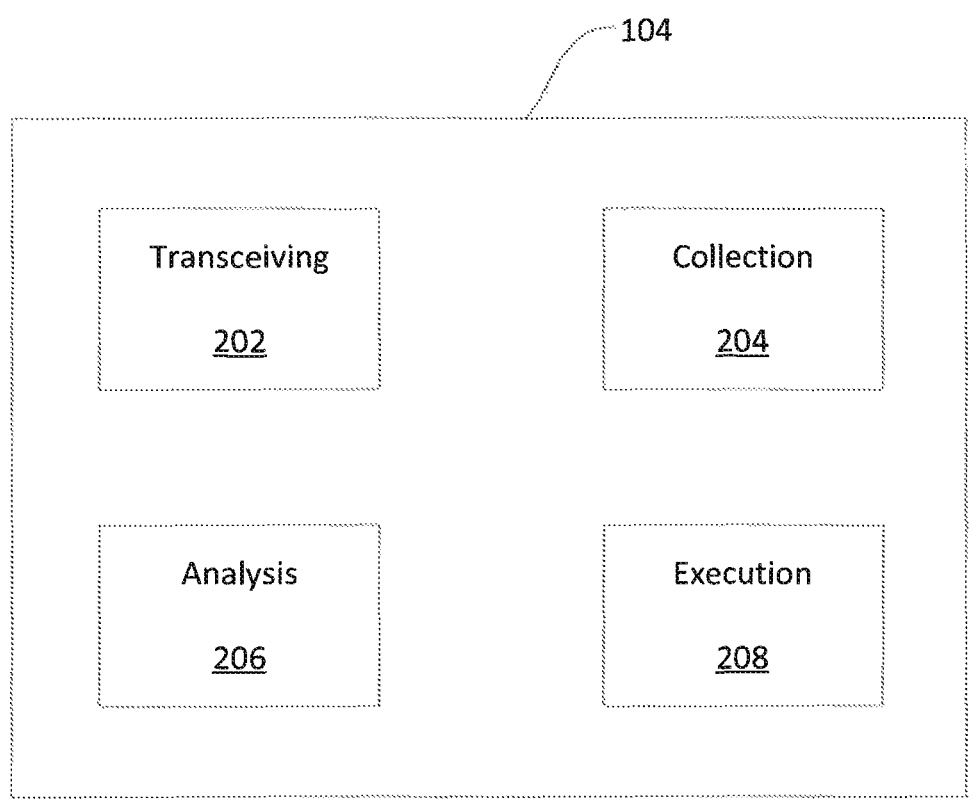
FIG. 2 depicts one embodiment of a predictive device depicted in FIG. 1.

Referring to FIG. 2, predictive device 104 in one example comprises a transceiving engine 202, a collection engine 204, an analysis engine 206, and an execution engine 208. The term "engine" denotes a functional operation that may be embodied either as a stand-alone component or as an integrated configuration of a plurality of subordinate components. Thus, an engine may be implemented as a single module or as a plurality of modules that operate in cooperation with one another. Moreover, an engine may be implemented as software instructions in memory or separately in any of hardware (e.g., electronic circuitry), firmware, software, or a combination thereof. In one embodiment an engine contains instructions for controlling a processor to execute the functionality described herein.

Referring further to FIG. 2, transceiving engine 202 provides the functionality by which information relating is exchanged (received and transmitted) between predictive device 104 and telematics device 102 and back end systems 106. Such functionality includes functionality for encoding, decoding, encrypting, and decrypting data for transmission over network 108.

Collection engine 204 in one embodiment provides the functionality by which data received from telematics device 102 and third party systems 106 is collected and organized. Such data includes but is not limited to data regarding a living thing or an object (an "entity"). Examples include: Information about an entity's movements, such as where an entity has traveled and the route that the entity has taken to reach a destination; information regarding the manner in which an entity traveled to a destination, such as the speed of the entity, braking force, the time of day; information regarding the conditions of such movement, such as the weather or traffic conditions, information about whether and how often other technology was used during the trip, such as mobile phone, computer or navigation system; information regarding the entity's stay at a destination, such as how long the entity stayed at a destination or whether there were other entities present; information regarding the nature of the destinations, such as weather the destination is a home or business, and the type of home or business (e.g. sale property, gym, restaurant, car dealer, etc.); and information about the health of the entity itself, such as vehicle diagnostic information or information about an individual's health, such as blood pressure, weight, blood composition, etc.

Analysis engine 206 in one embodiment comprises the functionality by which provider device analyzes data from telematics device 102 and/or third party systems and extracts meaning from such data. Analysis engine 206 in one example examines telematics data received from telematics device 102 and extracts meaning from the data provided from the telematics device 102. Such meaning may be extracted in different ways.

In one instance, analysis engine 206 may try to identify a pattern of behavior from telematics data and extract meaning from it. A pattern of behavior may be engaging in a certain type of behavior with at a certain level of frequency. For example, driving to the same address every day may indicate that an individual lives or works at the address. In another example, analysis engine 206 may evaluate patterns of behavior based on multiple variables. For instance, driving to the same address each day during business hours may have a different meaning than driving to the same address outside of business hours. Analysis engine 206 may interface with back end systems 106 to extract meaning from the data. For instance, analysis engine 206 may access insurance, tax, or business records to determine the nature of an address and infer as to why an entity is traveling to the address.

In another instance, analysis engine 206 may infer meaning from the absence of a particular type of behavior. For instance, if an entity were to drive to the same address every Monday through Friday, at the beginning of business hours, for five years, and the same entity were to suddenly stop driving to the address (and continued over a period of days to not drive to the address), then the failure to drive to the address may indicate that the entity was, but is no longer employed, by the business located at the address.

In another instance, analysis engine 206 may infer meaning from a sudden spike of activity. For example, if an entity were to suddenly start driving to an address of a fitness club after work, analysis engine 206 may determine that the individual is exercising regularly. In another example, if an entity were to begin regularly stopping at a maternity store, analysis engine 206 may determine that the entity is expecting a child. A subsequent overnight stay in a maternity ward of a hospital would confirm that a child was born.

Referring further to FIG. 2, in one embodiment, vehicle telematics data is received from telematics device 102. In one example, such vehicle telematics data includes, but is not limited to, vehicle maintenance records and/or driving style (e.g. speed, braking habits, etc.). Analysis engine 206 utilizes such information in the calculation of a premium for an insurance policy. Alternatively, such information may be used to calculate eligibility and pricing for an extended vehicle protection program.

Referring further to FIG. 2, in one embodiment, location telematics data is received from telematics device 102. In one example, such telematics data includes, but is not limited to, the record of where a particular entity has physically been over a period time. Analysis engine 206 in one example overlays such location data against data identifying the location of various businesses or organizations. If a particular entity has been proximate to a particular business or organization at a given level of frequency, analysis engine 206 may determine that such entity may be interested in targeted advertising or in promotional offers related to such businesses or organizations.

Referring further to FIG. 2, in one embodiment, health telematics data is received from telematics device 102. In one example, such health telematics data includes, but is not limited to, vehicle maintenance records or health records of an individual. Analysis engine 206 may utilize such information in conjunction with location telematics data to determine product or service providers that may be of interest to the entity. The analysis engine 206 may determine that the entity may be interested in targeted advertising or promotional offers based on the health of the entity and location telematics data. For instance, if a car needed an oil change, the analysis engine 206 may identify oil change shops within the proximity of telematics device 102. If an individual were sick, as determined by biometric sensors, then analysis engine may identify doctors' offices, pharmacies, or hospitals near telematics device 102.

Referring further to FIG. 2, in one embodiment, telematics data is received from telematics device 102. In one example, analysis engine 206 utilizes such telematics data to determine the relevancy of such data to a life insurance policy premium and develop a new system for underwriting and/or pricing life insurance. Risky and/or safe driving behavior as collected by the telematics device 102 and analyzed by the engine 206 may warrant modified decisions or prices based specifically on the inherent additional (or lower) risk of driving. Additionally, driving behavior may be a significant predictor of risk for all causes of life insurance peril. As such, its impact on life insurance extends much beyond the direct risk of driving. In another example, if an individual drives an automobile in poor condition, then analysis engine 206 may determine that a life insurance policy premium should be increased, or vice versa (e.g. vehicle in good condition). In another example, if an individual's biometric sensors indicate that the individual is making poor life style choices (e.g. drinking, smoking, gaining weight, etc.), then analysis engine 206 may determine that a life insurance policy premium should be increased, or vice versa (e.g. good lifestyle choices).

Referring further to FIG. 2, in one embodiment, location telematics data is received from telematics device 102. In one example, analysis engine 206 utilizes such location telematics data to predict life events for users of telematics device 102 and based on predicted life event determine if there is a form of assistance that can be offered to the user. Examples include, but are not limited to: If an entity travels to properties that are for sale with certain degree of frequency, analysis engine 206 may determine that the entity is in the market for new home and may determine that targeted advertising or products (e.g. home inspection, mortgage products) related to a new home sale may be of interest to the entity; in another example, if an entity travels to a car dealership with a certain degree of frequency, then analysis engine 206 may determine that the entity is in the market for a new car and determine that targeted advertising or products (e.g. sale price, auto loans, etc.); in another example, if an entity drives to residential addresses before driving to a large business, the analysis engine 206 may infer that the entity is part of a car pool, and determine that an insurance rate adjustment may be warranted; in another example, if an entity regularly drives to an elementary or middle school, analysis engine 206 may infer that the entity has children and use such information to adjust an insurance rate; in another example, if an entity regularly drives to a high school, analysis engine 206 may infer that the entity has high school age children and that such children should be added to an insurance policy; in another example, if an entity regularly drives to a particular type of business (e.g. a payday loan business), then analysis engine 206 may determine that the entity is in need of financial or career assistance;

Referring further to FIG. 2, in one embodiment, location telematics data, time of day traveled, day of week traveled, and hours spent at a particular location are received from telematics device 102. In one example, analysis engine 206 utilizes such telematics data along with other available data to predict the best channel and time of day to contact users of telematics device 102, thereby increasing the likelihood of successful contact to provide information or product offers. Examples include, but are not limited to: If an entity is consistently located at a particular residence between the hours of 7 pm and 9 am and regularly uses their cellular phone from 8 pm to 10 pm, analysis engine 206 may determine the best time to contact the entity is between 8 pm to 10 pm and the best method of contact is their cellular phone. Similarly, the analysis engine may determine the entity regularly visits carrier's website between the hours of 8 pm and 10 pm on Wednesday evenings when all of the entity's vehicles are located at a particular residential address. The best method of contact in this case may be an email or website notice slightly before the time the entity typically visits the site.

Referring further to FIG. 2, execution engine 208 in one example comprises the functional block that acts in response to determinations made by analysis engine 206. In one example, once analysis engine 206 makes a determination, it will notify execution engine 208, which will then effect a certain result in response to the determination. For instance, if analysis engine 206 determines that an insurance premium should be adjusted, execution engine 208 will communicate with back end systems 106, which may be an insurance company server, to effect a premium adjustment. In another example, if analysis engine 206 determines that an entity would be interested in targeted advertising, products, and/or services, execution engine 208 will communicate with back end systems 106, which may be servers of advertising providers or purveyors of products and services, to provide such targeted communications to the entity. It should be noted that predictive device 104 may, in some examples, be operated by purveyor of targeted advertising, products, and/or services; hence, the representation of predictive device 104 as separate from back end devices 106 is done for illustrative purposes only.

Figure 3:
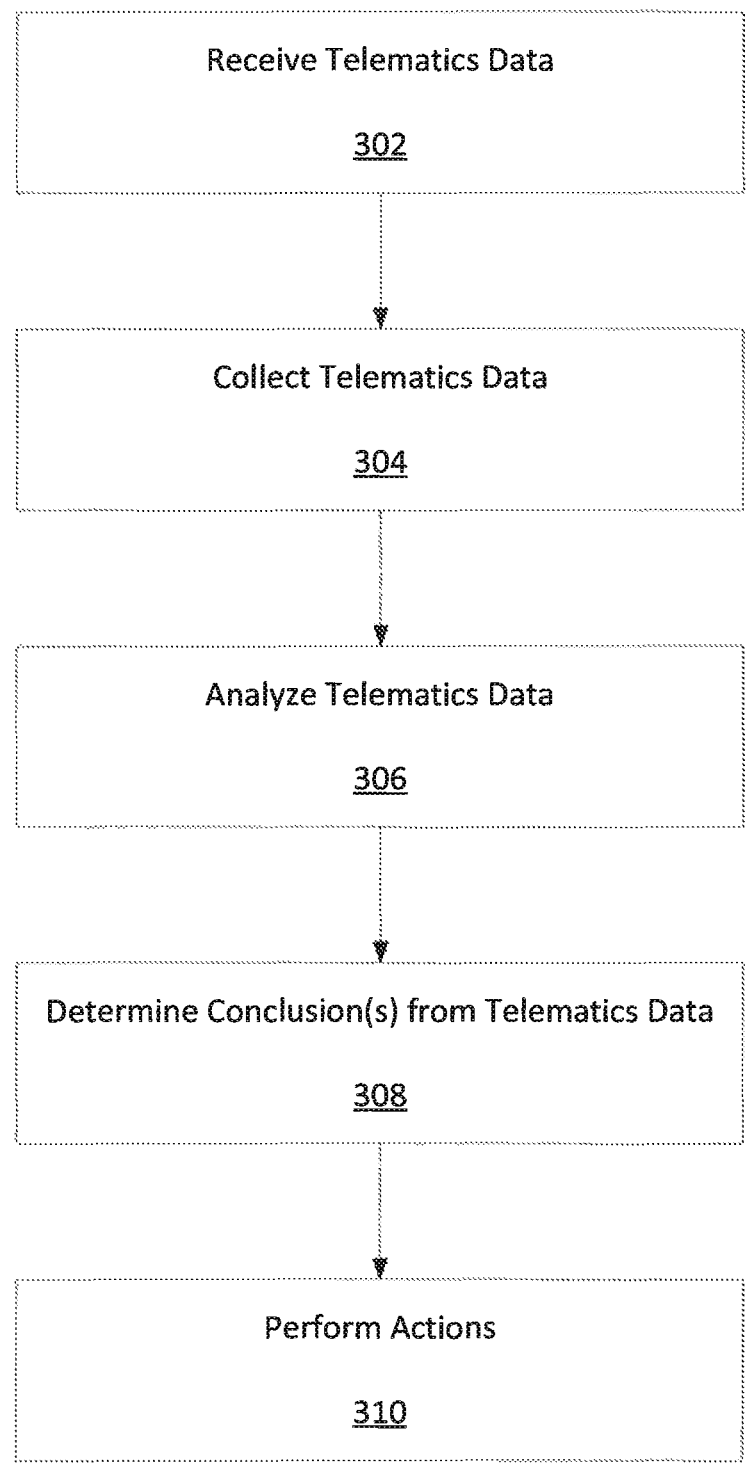
FIG. 3 depicts a process flow chart in accordance with certain illustrated embodiments.

With reference now to FIG. 3, shown is a flow chart demonstrating implementation of the various exemplary embodiments. It is noted that the order of steps shown in FIG. 3 is not required, so in principle, the various steps may be performed out of the illustrated order. Also, certain steps may be skipped, different steps may be added or substituted, or selected steps or groups of steps may be performed in a separate application following the embodiments described herein.

Starting at step 302, and as mentioned above, telematics device 101 receives telematics data (preferably from one or more sensors (e.g., telematics data capturing devices)) with regards to an entity, which data includes, but is not limited to, data regarding a living thing (e.g., a human) or an object (e.g., a vehicle). For instance, the received telematics data may relate to behavioral, movement, object condition and health data. The telematics data may additional relate to vehicle diagnostic information and/or an individual's health. Next, at step 304, the received telematics data is preferably collected and organized, preferably via collection engine 204 of predictive device 104.

Next, at step 306, the received and collected telematics data is analyzed. As mentioned above, predictive device 104 (via analysis engine 206) analyzes data from telematics device 102 and/or third party systems and extracts meaning from such data. Analysis engine 206 in one example examines telematics data received from telematics device 102 and extracts meaning from the data provided from the telematics device 102. Such meaning may be extracted in different ways. For instance, analysis of received telematics data may include determining a certain type of behavior at a certain level of frequency to determine behavioral conclusion, wherein determining a certain type of behavior at a certain level of frequency includes determination of travel to a certain location at a certain time period. Analysis of received telematics data may further include analyzing business record data relating to a certain location wherein the business record data, for example may relate to tax, insurance and business filings. Analysis of received telematics data may further include determining a change in behavioral pattern whereby frequency of travel to a certain location has changed by a prescribed value (e.g., travel to a certain location has ceased or increased).

Next, at step 308, predictive device 104 is configured and operational to determine conclusions (e.g., behavioral conclusions) based upon the analyzed telematics data (step 306). As mentioned above, analysis engine determines meaning from the telematics data. It is noted in accordance with the illustrated embodiments, behavioral conclusions (e.g., "meaning") includes, but are not limited to: a change in employment; change in marital status, change in family size (e.g., birth and/or death); a change in residence; a change in an entity's health condition; and/or a change in an entity's insurance risk profile.

Proceeding to step 310, analysis engine 206 (via execution engine 208) is configured and operational to perform certain actions responsive to the aforesaid determinations/conclusions. That is, and as mentioned above, if analysis engine 206 determines that an insurance premium should be adjusted, execution engine 208 will communicate with back end systems 106, which may be an insurance company server, to effect a premium adjustment.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof.

Although the systems and methods of the subject invention have been described with respect to the embodiments disclosed above, those skilled in the art will readily appreciate that changes and modifications may be made thereto without departing from the spirit and scope of the subject invention.

What is claimed is:

1. A computer system for performing predictive analytics on telematics data regarding an entity, comprising:

a telematics device configured to capture telematics data regarding location information associated with an entity and couple to a network for transmitting the captured data;

a predictive analytical computer device coupled to the network, which includes:

a memory configured to store instructions;

a processor disposed in communication with said memory, wherein said processor upon execution of the instructions is configured to:

receive telematics data from the telematics device;

analyze said received telematics data to identify a pattern of location behavior associated with the entity regarding travel to a certain location and to determine a change in travel frequency to the certain location; and determine a predictive behavioral conclusion for the entity based on said analysis of said received telematics data.

2. A computer system as recited in claim 1 wherein said entity is a human.

3. A computer system as recited in claim 1 wherein said determining the predictive behavioral conclusion includes determination of travel to the certain location at a certain time period.

4. A computer system as recited in claim 1 wherein said analysis of said received telematics data further includes analyzing business record data relating to said certain location, wherein said business record data is received from a third party source.

5. A computer system as recited in claim 1 wherein said telematics device is a wearable computing device.

6. A computer system as recited in claim 1 wherein said predictive behavioral conclusion includes a change in employment.

7. A computer system as recited in claim 1 wherein said predictive behavioral conclusion includes a change in residence.

8. A computer system as recited in claim 1 wherein said predictive behavioral conclusion includes a change in an entity's health condition.

9. A computer system as recited in claim 1 wherein said predictive behavioral conclusion includes a change in an entity's insurance risk profile.

10. A computer system as recited in claim 1 wherein said predictive behavioral conclusion includes a change in an entity's marital status.

11. A computer system as recited in claim 6, wherein said predictive behavioral conclusion includes determining an employment location.

12. A computer system as recited in claim 8, wherein said predictive behavioral conclusion includes determining travel frequency to a gym location.

13. A computer system as recited in claim 1 wherein said predictive behavioral conclusion includes a change in a maternity status.

14. A computer system as recited in claim 13 wherein said predictive behavioral conclusion includes determining travel frequency to a maternity retail location.

15. A computer system as recited in claim 1 wherein said predictive behavioral conclusion includes determination of carpool participation.

16. A computer system as recited in claim 1 wherein said telematics device is a camera device.

17. A computer system as recited in claim 1 wherein said telematics device consists of a plurality of devices.

18. A computer system as recited in claim 1 wherein said telematics device is a smart phone device.

19. A computer system as recited in claim 1 wherein said telematics device is a portable computing device.

20. A computer system as recited in claim 1 wherein said telematics device is a vehicle navigation system.

* * * * *